United States Patent [19]

Taboada et al.

[11] Patent Number: 5,157,451
[45] Date of Patent: Oct. 20, 1992

[54] LASER IMAGING AND RANGING SYSTEM USING TWO CAMERAS

[76] Inventors: John Taboada, 12530 Elm Country, San Antonio, Tex. 78230; Louis A. Tamburino, 2930 E. Stroop Rd., Kettering, Ohio 45440

[21] Appl. No.: 677,898

[22] Filed: Apr. 1, 1991

[51] Int. Cl.⁵ ............................................... G01C 3/08
[52] U.S. Cl. ........................................ 356/5; 356/2; 356/152; 358/125
[58] Field of Search ................ 356/1, 2, 5, 141, 152; 358/108, 125

[56] References Cited

U.S. PATENT DOCUMENTS

| | | | |
|---|---|---|---|
| 3,409,369 | 11/1968 | Bickel | 88/1 |
| 3,465,156 | 9/1969 | Peters | 250/199 |
| 3,504,182 | 3/1970 | Pizzurro et al. | 250/199 |
| 4,515,472 | 5/1985 | Welch | 356/5 |
| 4,687,326 | 8/1987 | Corby, Jr. | 356/5 |
| 4,967,270 | 10/1990 | Ulich et al. | 356/5 X |

OTHER PUBLICATIONS

Three Dimensional Using a Single Pulse; Knight, Klick, Howard A. M. Beckman, Telos Corp. Laser Radar IV (1989).
Design Handbook, Three Dimensional Machine Vision, Dr. Leonard H. Bieman; May 1988.
Precision Pulse Generator Dig. Delay Gen. Star Besearch Syst. Inc.

*Primary Examiner*—Mark Hellner
*Attorney, Agent, or Firm*—Gerald B. Hollins; Donald J. Singer

[57] ABSTRACT

A pulsed laser illumination based two camera ranging and imaging system which requires only a single axis optical aperture and is therefore suited to use on aircraft and other space and configuration limited apparatus is disclosed. The invention uses intensity coded partial images of the distant target with the partial images being obtained by a distance segregating optical modulation arrangement which separates pixel portions according to their arrival time and thereby their distance of travel from the target. The described system uses pixel by pixel processing of the segregated images as accomplished in an image array processor or general purpose computer, for example.

12 Claims, 3 Drawing Sheets

LASER IMAGING AND RANGING SYSTEM USING TWO CAMERAS

RIGHTS OF THE GOVERNMENT

The invention described herein may be manufactured and used by or for the Government of the United States for all governmental purposes without the payment of any royalty.

REFERENCE TO RELATED APPLICATION

This application is somewhat related to application Ser. No. 07/677,896 titled LASER IMAGING AND RANGING SYSTEM USING ONE CAMERA that is filed in the name of the same inventors and filed of even date herewith.

BACKGROUND OF THE INVENTION

This invention relates to the field of optical range mapping of the nontriangulation type.

In activities as diverse as midair refueling, automatic target recognition, robotic vision, space docking, industrial inspection and customized equipment design, for example, there is need for precise mappings of range measurements. Often such measurements are over distances in excess of that accommodated by conventional graduated tension member measurement or impractical of such measurement.

The term mapping in this description includes the concept of range determination for a multiplicity of different points located on the distal target object and therefore is inclusive of aspects relating to shape and size of the target object.

In the past, such techniques as triangulation using optical images taken from two different viewpoints, or the time for energy propagation to and from points on a distal target object have been employed for accomplishing range mapping measurements. In range mapping systems, however, there is often a need for such speed and accuracy and operational simplicity in determining range maps of a distal target as to preclude the use of previous measurement techniques. The triangulation range determination, for example, as is often used in cameras and in artillery measurement periscopes is slow and often cumbersome in range mapping accomplishment and somewhat difficult to perform automatically as a computer or electronics system operating function.

Since triangulation usually involves two superimposed or split field images for indication, it often requires the conclusion of a human interpreter to reliably complete the measurement. Another example of triangulation impracticability is to be found in the field of airborne weaponry wherein it is often difficult to separate a plurality of optical apertures by a meaningful distance on the limited confines of an airframe—and yet there is a strong need for quick and accurate measurement of range maps for use in rocketry and other weapons related functions.

Since many current uses for a range mapping system impose requirements of nonhuman interpretation, small physical size, the use of a single optical aperture, and accuracy in both the near field and far field environment, there is need in the art for an improved range mapping system such as the present "Laser Imaging and Ranging Systems Using Two Cameras". Parenthetically, in view of this name and accomplished function, the system of the present invention can be conveniently referred to by way of the acronym LIMAR/2 which is based on the first or first and second letters of the words appearing in the name. The present document hereby incorporates by reference the above referred-to one camera laser imaging and ranging system patent document.

The patent art includes several examples of range mapping systems including laser operated systems which are of interest with respect to the present invention. Included in these patent examples is U.S. Pat. No. 3,409,369, issued to G. W. Bickel and concerning a laser radar system which operates on the Doppler velocity measuring principle using two different transmitted frequencies in order to obtain a conveniently low difference frequency. Since the Bickel apparatus is principally concerned with the Doppler operating concept and target velocity measurement, the present invention is readily distinguished therefrom.

Also included in these prior patents is U.S. Pat. No. 3,465,156 issued to C. J. Peters and concerned with a laser communication system which employs a narrow band noise cancellation technique with the transmitted laser beam divided into two different paths. The Peters invention received laser light is also split into two beams one of which contains video signal modulation and both of which contain noise components. Since the Peters apparatus is concerned with a laser communication system, the present invention range mapping concepts are readily distinguished.

Also included in these prior patents is U.S. Pat. No. 3,504,182 issued to V. F. Piezzurro et al and concerned with an optical communication system. In the Piezzurro et al communication system scanning by the beam emitted from one station is used to "acquire" the scanning pattern of a second station in order that the two stations can lock-on and be ready to transmit and receive information. Distinctions between the present invention and the communications system of Piezzurro et al are readily apparent.

Also included in this art is the laser radar mapping system of F. K. Knight et al reported in Applied Optics, Vol. 28, pp. 2196-2198, June 1989. In this system, use is made of a streak camera to obtain range maps of objects at a distance. The Knight et al apparatus does not teach the use of an electromagnetic shutter encoding as in the present invention.

Also included in this art is the U.S. Pat. No. 4,515,472 of A. B. Welch which is concerned with an agile receiver for a scanning laser radar system. The Welch apparatus uses a receiver frequency adjustment arrangement in order to rapidly acquire, recognize, track and perform simultaneous guidance functions for a multiplicity of weapons against a multiplicity of targets. In view of this purpose and functioning of the Welch apparatus, distinction from the present invention range mapping system is easily discerned.

SUMMARY OF THE INVENTION

In the present invention short pulsed laser radiation is projected onto a target object and the returning scattered light captured and modulated by an electro-optic system and then split into two separate and complementary partial images at two optical to electrical transducer camera devices. In the partial images a returning signal is optically modulated with a time dependent range indicating signal. This modulation enables decoding of the pixel intensity in the corresponding images of the two cameras to derive a range indication. The decoding may employ an image processing system. The invention provides a numerical map of range indication that is registered with an optical image of the system output.

An object of the present invention is therefore to provide a single optical aperture laser range map measuring system.

Another object of the invention is to provide a range measuring arrangement in which the range characteristic information is coded into the form of pixel intensity in an optical image.

Another object of the invention is to provide a range mapping system in which an image of the range mapped target is also available.

Another object of the invention is to provide a range mapping system in which the intensity coded information of two range map determining partial images is also usable for reconstructing a full image of the range mapped target.

Another object of the invention is to provide a range map measuring system in which the range communicating signals are preserved in the form of pixel intensity ratio modulation without reliance on absolute values of pixel intensity.

Another object of the invention is to provide a range indicating system in which two partial images from single axis views of the range mapped target are utilized.

Another object of the invention is to provide for the presentation of two-dimensional and three-dimensional image information in a fully compatible format.

It is another object of the invention to provide a single apertured two camera range mapping system.

It is another object of the invention to provide a single apertured range mapping system in which the range indicating data is stored in the form of two partial images of the range determined target.

It is another object of the invention to provide a range mapping system which is especially convenient for use on aerospace and autonomous vehicles.

It is another object of the invention to provide a time of propagation range measurement system which employs simplified electro-optical switching.

It is another object of the invention to provide a range mapping system in which noise reduction through the use of signal time averaging may be accomplished.

It is another object of the invention to provide a time of propagation range determining system which can be accomplished without use of a streak camera.

It is another object of the invention to provide a range mapping system which can be accomplished without the use of moving parts.

These and other objects of the invention are achieved by a single optical aperture target range determination system having pulsed optical energy generating laser means for illuminating said target via said optical aperture; optical modulator means for dividing the reflected optical signal returning to said aperture from said pulse illuminated target into two time-of-arrival proportioned range coded optical signal components; means for generating electrical signals indicative of the magnitude of said range coded first and second component optical signals; and means for recording electrical signals in pixel organized array.

Additional objects and features of the invention will be understood from the following description and claims and the accompanying drawings.

DETAILED DESCRIPTION

Figure 1:
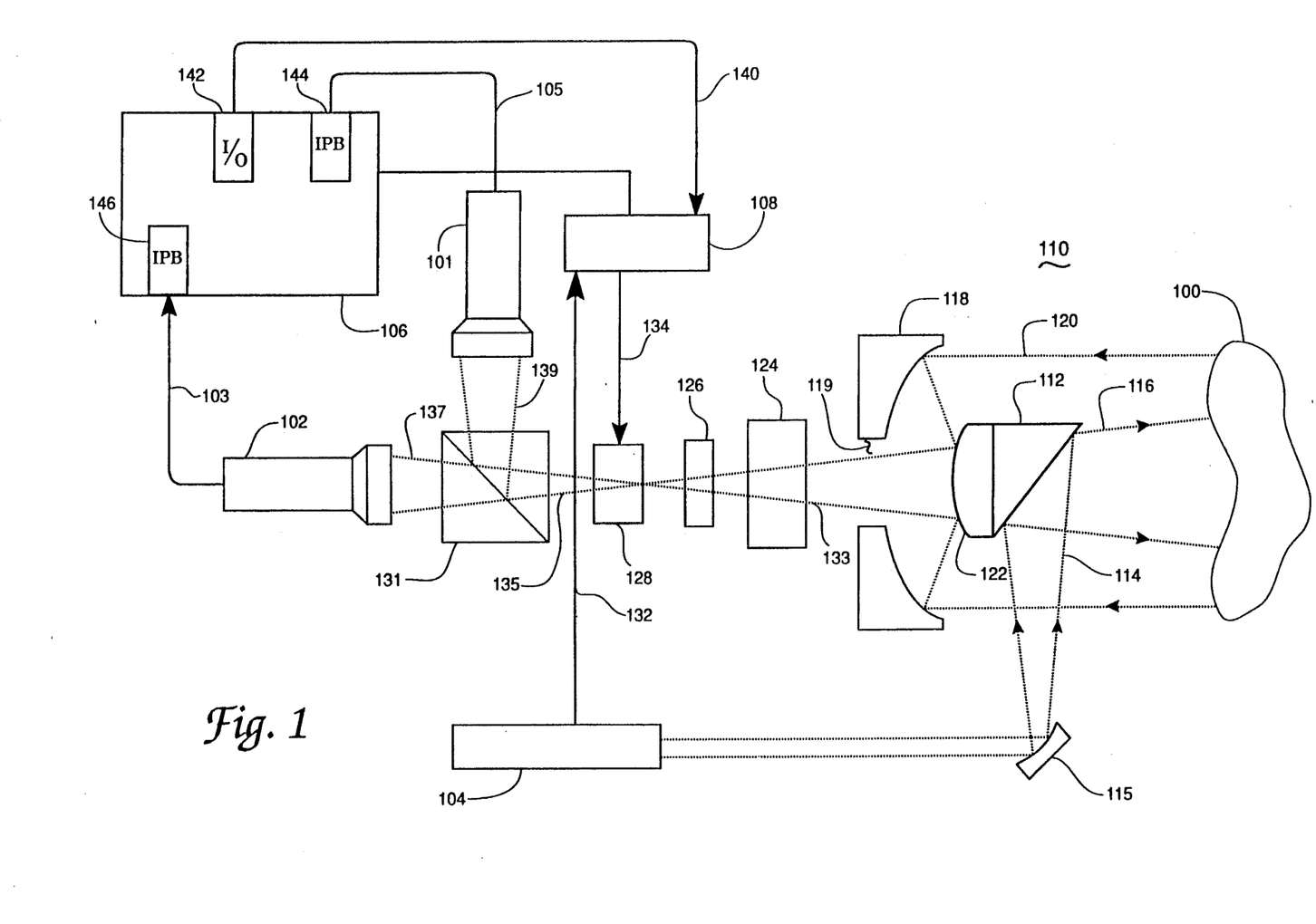
FIG. 1 shows a block diagram of a range mapping system in accordance with the invention.

FIG. 1 in the drawings shows a two camera embodiment of a laser imaging and ranging system that is in accordance with the present invention. In the FIG. 1 system, a distal target 100 is illuminated by light from a laser 104 by way of an optical system that is generally indicated at 110. The returning reflected light from the target 100 is ultimately received in a pair of video cameras 101 and 102 in FIG. 1 where it is transduced into a pair of electrical signals that are conducted along the paths 103 and 105 to a digital image processing system 106.

In the FIG. 1 optical system coherent light emission from the laser 104 is communicated along the path 114 by way of the mirrors 112 and 115 to the path 116 which terminates in the distal target 100. Light reflected from the target 100 is communicated by the path 120 to the concave and convex mirrors 118 and 122 for reflection through the mirror aperture 119 to 10 the optical filter elements 124 and 126 and thence to the electro-optical polarization modulating element 128. The filter 124 in this optical system is of the optical bandpass type and restricts the light transmitted from the convex mirror 122, that is light along the path 133, to a narrow spectral band which includes the wavelength of the laser 104. The filter element 124 additionally restricts the light along the path 133 to components which are polarized in a single plane-such as the plane perpendicular to the FIG. 1 drawing, for example.

The electro-optical element 128, which may be of the Kerr cell or Pockels cell type, accomplishes a controllable degree of polarization rotation in response to electrical signals received along the path 134. Polarized light that is rotated in accordance with the modulation signal received on the path 134 emerges from the electro-optic modulating element 128 along the path 135 whereupon it enters the polarizing beam splitting cube 131 and is divided into two complementary amplitude optical signals along the paths 137 and 139. These optical signals are received on the optical to electrical transducer retina portions of the video cameras 101 and 102 where conversion to electrical signals that are communicated along the paths 103 and 105 to the microprocessor digital image processing system 106 occurs. In the image processing system 106, the intensities of corresponding pixels of the images received at the cameras 101 and 102 are compared for a determination of range of the distal target 100. A time dependent proportioning of the returning light signal on the path 133 into signals along paths 137 and 139 is achieved in the FIG. 1 system in order to accomplish the desired range map.

The electro-optical polarization modulating element 128 is connected to the Driver-Pulse Generator Circuitry (DPGC) 108 by the path 134 for communication of the driving signals generated by the driver-pulse generating circuit 108. The DPGC 108 in turn receives control signals along the path 140 from the input-output circuit portion 142 of the microcomputer digital image processing system 106 as well as synchronizing pulses from the laser 104 along the path 132.

A conventional computer input-output circuit card such as the analog Devices Model RTU-800 or 815 may be used for the input-output circuit portion 142 of the microcomputer 106 to accomplish the control signal generation. The microcomputer 106 can be one of the many such computers now available commercially including an IBM-AT personal computer as is manufactured by IBM Corporation of New York state, U.S.A. Image processing boards such as the ITEX type 100 processors may be received at 144 and 146 in the computer 106. The output of the image processing boards 144 and 146 may be coupled to a pair of memories where pixel by pixel storage or other storage arrangements are used to enable mathematical processing of the data for range mapping. This memory may be included in the processor 106 or located external thereto.

Figure 4:
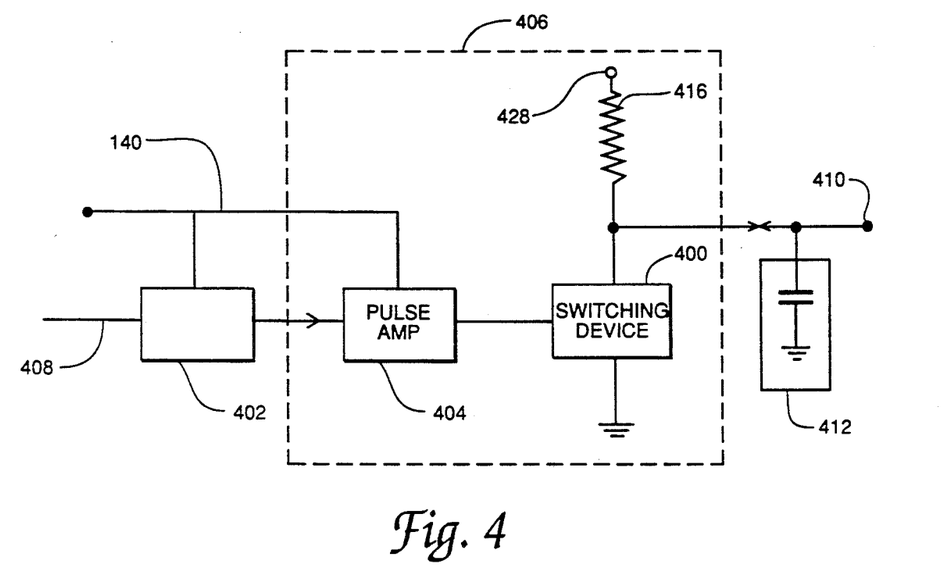
FIG. 4 shows elements of a modulation waveform generating circuit usable in the FIG. 1 system.

Referring to FIG. 4 the DPGC 108 of FIG. 1 is shown to be comprised of a signal delay generator 402 and a high voltage signal generator. The signal delay generator 402 may be, for example, a Stanford Research Systems Inc. Model DG 535 Pulse Generator or similar apparatus. The Stanford generator is made by Stanford Research Systems Inc. of Palo Alto, Calif.

The high voltage signal generator 406 is comprised of a capacitor charging source, the resistor 416 and the source of high voltage DC energy 428, together with a fast electronic controlled switch 400 and a pulse amplifier 404. The switch 400 may be comprised of a transistor such as the IRFPG 50 power field effect switching transistor sold by International Rectifier Corporation or may be a vacuum tube or solid state device capable of operating at the five hundred volt or more signal levels described herein for the electro-optical polarization modulating element 128. A switching transistor system of this type is disclosed in the article "Nanosecond Switching Using Power FET's" by R. J. Baker et al appearing in Review of Scientific Instruments, volume 61, page 2211 (1990) which is hereby incorporated by reference herein.

The pulse amplifier 404 in FIG. 4 is controlled by the generator 402 and provides signals suitable for the FET gate or vacuum tube grid electrode or other input of the switching device 400. Depending upon the capabilities of the generator 402 and the requirements of the switching device 400, the amplifier may be embodied as a commercially fabricated amplifier, a multiple staged feedback amplifier, a single solid state or vacuum tube device or eliminated entirely. The latter possibility can be used when the switching device 400 has input requirements within the capabilities of the generator 402.

When the switching device 400 conducts it shorts or removes or dissipates the charge built-up on the inherent capacitance 412 of the electro-optical polarization modulating element 128. When the switching device 400 is restored to the off condition, the capacitance 412 again charges toward the high voltage at 428 through the resistance 416. This charging and shorting under control of the generator 403 creates the waveform shown in FIG. 3 of the drawings.

The laser 104 in the FIG. 1 system produces synchronizing signals which communicate along the path 132 to the DPGC 108. These signals are received at 408 in the FIG. 4 circuit by way of a RS 232 port or the IEEE standard port that is available on the Stanford DG 535 and similar other pulse generator apparatus usable at 402.

The signal across the capacitance of the electro-optical polarization modulating element 128 is present at the node 410 in FIG. 4. This signal corresponds to the signal on the path 134 in FIG. 1 and controls the degree of polarization modulation achieved and thereby proportions the light dependent electrical signals flowing from the cameras 101 and 102. The representing electrical signals from the cameras 101 and 102 respectively are coupled to the image processor boards 144 and 146 of the image processing system or microprocessor 106.

The laser 104 in the FIG. 1 system is selected to have a pulse duration that is smaller than the time of signal propagation across a typical dimension of the target 100 geometry. For target objects of the size of an automobile, for example, the laser 104 is preferably of the mode-locked Q-switched and cavity dumped yttrium aluminum garnet (YAG) type which is operated in the frequency doubling mode to produce a 532 nanometer wavelength sequence of output pulses, pulses which are preferably in the order of 50 picoseconds in pulse length. Such lasers are available, for example, from Quantek International Company as a model YG 501C-10 laser. The output energy from the laser 104 is communicated along the paths 114 and 116 by way of the planar mirrors 115 and 112 to the distal target 100 that is to be range mapped.

Optical energy returning from the distal target 100 is of greater cross section as a result of scatter, as is indicated by the path 120 in FIG. 1. In addition to this divergence, the signals along the path 120 are also displaced in time in accordance with the physical features and dimension of the target 100 and in keeping with the principle that signals returning from nearer portions of the target 100 involve a shorter distance of travel both to and from the target and thereby are received earlier in time than are the signals returning from more distant portions of the target 100.

Light along the path 120 from the distal target 100 is concentrated by the concave mirror 118 and imaged by the action of the convex mirror 122 through the intermediate elements onto the receiving plane or retinas of the video cameras shown in FIG 1. Cameras such as the Xybion type ISS 205 R3 may be used in the FIG. 1 system. Electrical signals originating in the video cameras may be received by image processing circuit arrays such as are typically provided by Imaging Technology Incorporated model FG-100-AT circuit boards located at 144 and 146.

The optical bandpass filter 124 in FIG. 1, as indicated above, preferably is arranged to favor the optical spectrum region in which the laser 104 operates, that is, the spectral region adjacent a wavelength of 532 nanometers; this filter may, for example, be embodied as a type 03 IFS 008 filter which is available from Milles Griot Corporation. The polarizing filter 126 in FIG. 1 may be embodied as a CVI Corporation part number CLPG 20 type filter.

Figure 5:
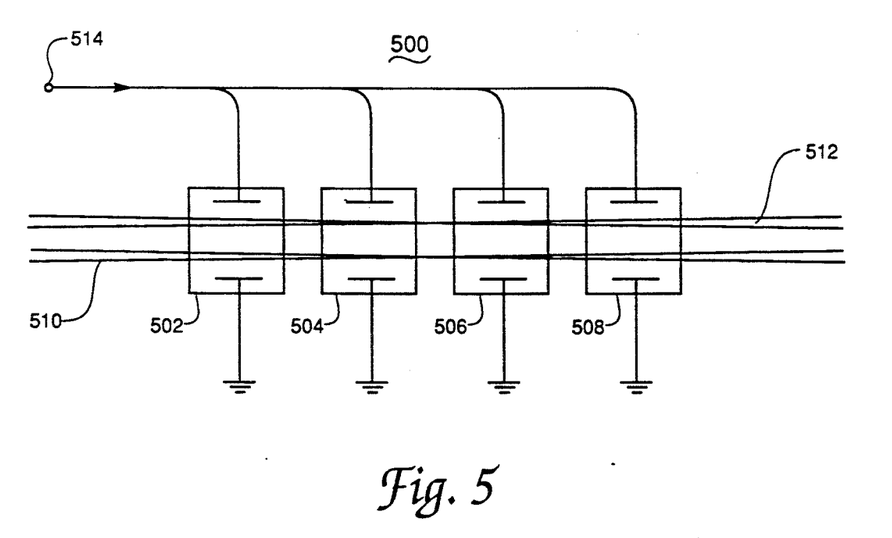
FIG. 5 shows an element arrangement for achieving the optical signal modulation employed in the FIG. 1 system.

An example of the electro-optical polarization modulating element 128 in FIG. 1 is comprised of a plurality of individual electro-optic crystals 500 in FIG. 5 of the drawings. As indicated in FIG. 5, this array preferably consists of the plurality of electro-optic crystals, indicated at 502, 504, 506, and 508 with these crystals being disposed in an optical series and electrical parallel array configuration. This disposition serves to distribute the polarization retardation angle and thereby reduce the required driver voltage, the signal applied at the node 514 in FIG. 5. Each of the crystals 502–508 and so on in FIG. 5 may consist of a commercially available large aperture Pockels cell which employs a crystal of, for example, potassium di-hydrogen phosphate (KD*P). Such cells are available from Cleveland Crystal Company as their model TX2650, for example.

In order to rotate the angle of polarization of light received along the path 512 in FIG. 5, that is, light received from the mirror 118 of FIG. 1, through an angle of ninety degrees, requires an electrical control signal of about two thousand four hundred volts be applied to a single Pockels cell crystal. With the four cell arrangement shown in FIG. 5, however, signals in the range of 600 volts are acceptable and are more convenient for generation in the signal generator circuit 108.

The rotated polarization output light beam of the array of crystals 500 in FIG. 5 is shown at 510; this beam corresponding to the optical signals along the path 135 in FIG. 1. Polarization rotation in the crystals 502, 504, 506, and 508 may, in fact, be accomplished by way of either the Pockels or Kerr effects, to achieve a fast time proportioned rotation of the plane of polarization in the individual cells, such effects being well known in the electro-optic art.

The light signal emerging from the FIG. 5 crystal array, the signal along the path 135 is analyzed as to polarization in order to segregate nearer and more distal portions of the image received from the target 100. This analysis results in intensity coding within the video camera apparatus of FIG. 1.

Figure 2:
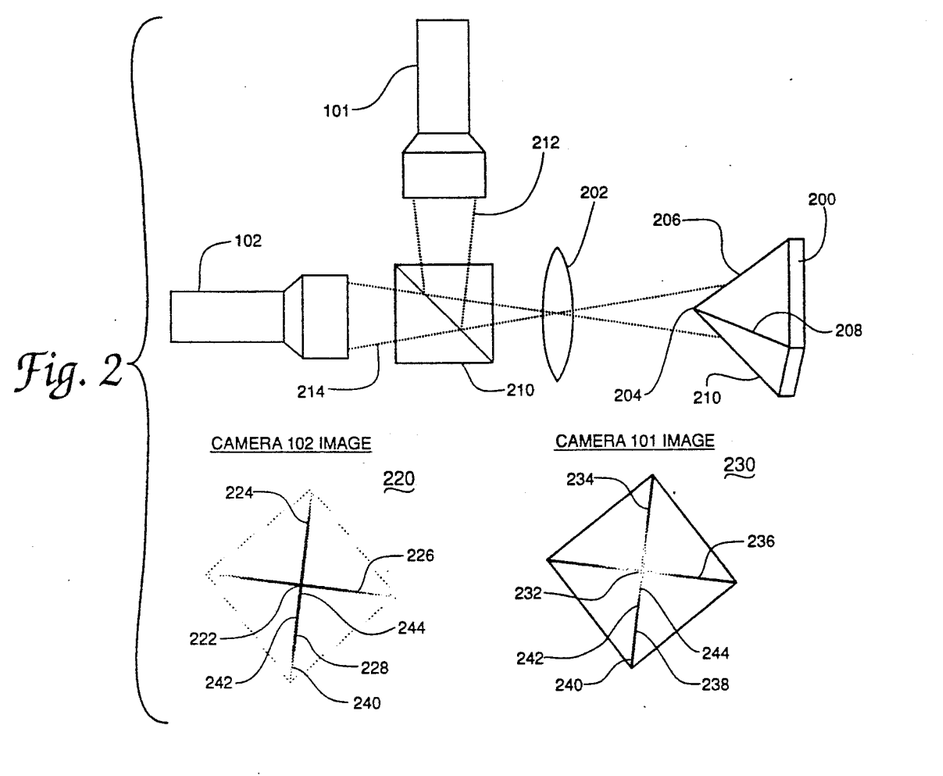
FIG. 2 shows the concept of image pixel intensity modulated storage used in the FIG. 1 system.

FIG. 2 of the drawings shows the nature of the two signals accomplished by the FIG. 1 electro-optical system. In the uppermost portion of FIG. 2, the cameras 101 and 102 are indicated along with the polarizing beamsplitter cube 210 and a representative optical system as depicted by the lens 202. These elements receive signals from an exemplary target represented by the pyramid 200. In the image received by the camera 102 as shown at 220 in FIG. 2, the most closely disposed portions of the pyramid 200, that is the apex image at 222 and the edge lines approaching the apex 222, appear in substantially normal form, however, as these lines approach the more distal portions at the base of the pyramid the intensity of their pixels decreases—as is represented by the dotted lines in the image 220. Along the line 228, for example, pixel intensity decreases progressively from the portion at 244 to the portion at 242 and to the portion at 240. The differing intensities of the pixels along the line 228 therefore represent differing distances from the lens 202 and the cameras 101 and 102 according to the coding scheme of the invention.

In a similar manner, the image received by the camera 101 is shown at 230 in FIG. 2—with the difference that the relationship between distance and intensity is reversed from that in the image 220. In the image 230, for example, the lines 234, 236, and 238 become of lower intensity as they converge on the apex 232 with the line portion 240 being of full intensity, the portion 242 of medium intensity and the portion 244 of lowest intensity.

It should be recognized that the FIG. 2 drawing at 220 shows the appearance of a target object which in real life has feature lines of constant intensity—since a target of this type is most useful in describing the functions of the FIG. 1 system. In reality, however, a target of varying feature line intensities is to be expected; therefore the FIG. 1 optical modulation will tend to further modify these non constant feature line intensities according to their close or distal location with respect to the FIG. 1 apparatus. The elected polarity of the optical modulation, that is whether the closely positioned or the distally positioned portions of the target are to be decreased in intensity by the modulation will also affect the appearance of the images received at the cameras with either polarity being usable if accommodated in other parts of the apparatus.

Considering briefly the theory supporting the FIG. 1 two camera system, there is an amplitude function A, B, for each pixel (i,j) in each of the two cameras which is equal to the product of a proportioning function and a gain function:

$$\text{CAMERA } 1 A(t)^* f(i,j) = \sin^2[hV(t)]^* f(i,j) \quad (1)$$

$$\text{CAMERA } 2 B(t)^* g(i,j) = \cos^2[hV(t)]^* g(i,j) \quad (2)$$

where the complementary proportioning functions satisfy $A + B = 1$ and where polarization angle is proportional to the voltage V and h is a constant. Such relationships are discussed in the text "Optics" published by Addison Wesley Inc., 1975 and authored by Hecht & Sajac. That $A + B = 1$ is obvious because the two split beams conserve the energy in the incoming beam. Different gain functions, f and g, characterize the light detection efficiency in the two separate cameras. The pixel indices specified by (i,j) allow for different gain constants for each pixel.

Figure 3:
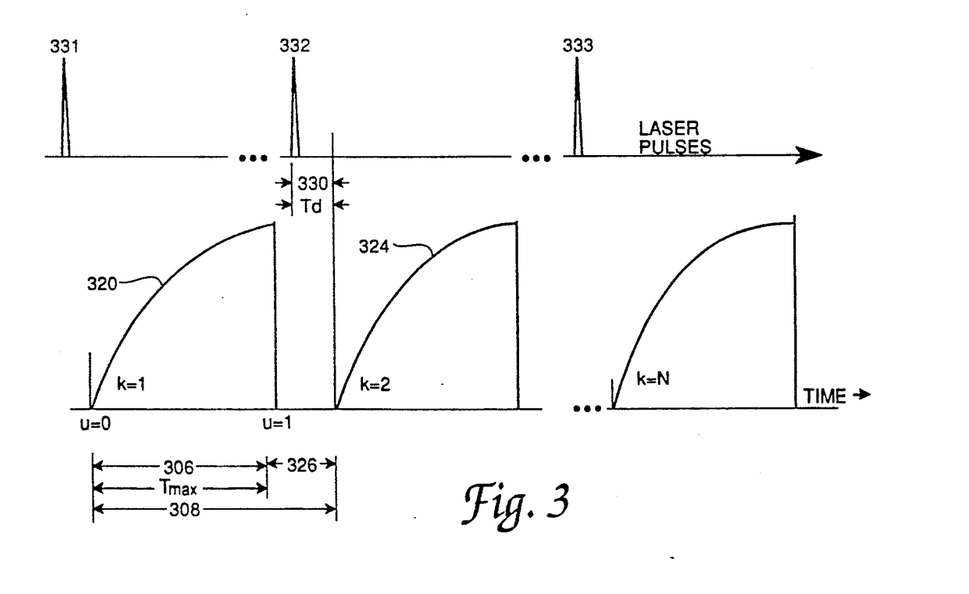
FIG. 3 shows the modulating waveform used with the FIG. 1 system.

The cameras 101 and 102 integrate the light returned from multiple laser pulses which can occur in the time for one camera cycle—a time which is typically 1/30 of a second. FIG. 3 depicts the polarization modulating signals and operating times over one camera cycle. In FIG. 3 a series of laser pulses 331, 332, and 333 are shown along with waveforms suitable for operating the electro-optic polarization modulating element 128 in FIG. 1. The pulses applied to the element 128 are identified with the symbols K=1, K=2, K=n in FIG. 3 and comprise several operating cycles as are indicated at 308.

In the FIG. 3 waveforms, the pulse envelopes 320 and 324 are determined as to waveshape or curvature by the relative sizes of the resistor 416, the voltage at 428, and the capacitor 412 in FIG. 4. Actually, the precise shape of these waveforms is not especially critical so long as the shape is known and can be accommodated mathematically during processing of the two camera received signals of the FIG. 1 system.

In the symbols shown in FIG. 3:

k = Pulse number in a given camera cycle.

N = Number of pulses or ramps per camera cycle.

Td = Width of time delay in seconds, corresponding to 326.

Tmax = Width of step or ramp in seconds, corresponding to 306.

u = "Normalized Ramp" Time having values between zero and one, where a value of one corresponds to Tmax seconds.

Vmax = the maximum applied voltage.

In order to simplify the following mathematical discussion, the time delay, Td, is assumed equal to zero. When time delays, Td, are finite, range computations require the addition of a distance equal to (c*Td/2) to each input element, where c is the velocity of light.

With respect to the Kerr or Pockels cell polarizing beam-splitter cube proportioning function, because the retardance of the linear polarization is proportional to the voltage applied across the longitudinal axis of the cell, the retardance angle satisfies $\theta(u) = hV(u)$, where h is constant. The polarizing beamsplitter cube, 131 in FIG. 1, splits the linearly polarized incoming beam into two beams along the paths 137 and 139 that are proportional to $\cos^2(\theta)$ and $\sin^2(\theta)$. These characterizations correspond to the squaring of the projected amplitudes to determine intensity of the split beams emerging from the polarizing beamsplitter cube.

With respect to incoming radiation, each pixel or picture element in the camera image plane represents a solid angle subset from which the pixel intercepts the incoming beam. The energy collected by the (i,j) pixel is specified by I(t;i,j) where the indices correspond to quantized polar angles to the reflecting surface element. If there is no surface element to reflect light back into a pixel specified by indices (i,j) then the function I(t;i,j) would be zero throughout the camera cycle. Otherwise, the reflected light signals can be modeled by delta function pulses in the relationship:

$$I(t;i,u) = I(u,k;i,j)\delta(u - 2r(i,j)/c), \qquad (3)$$

where I(u,k;i,j) is the intensity of the kth reflected signal, r(i,j) is the range or polar distance to the surface element reflecting light to the (i,j) pixel, and c is the speed of light. Effectively, use of the delta function model assumes that the emitted laser pulses are much shorter than the width of the voltage proportioning signals applied to the Pockels or Kerr cell array 128 in FIG. 1.

The light collected by each camera in each cycle is given by a sum of N integrals:

$$M1(i,j) = f(i,j) \sum_{k=1}^{N} \int_{u=0}^{1} A(u) I(u,k;i,j) \, du \qquad (4)$$

$$M2(i,j) = g(i,j) \sum_{k=1}^{N} \int_{u=0}^{1} B(u) \cdot I(u,k;i,j) \, du \qquad (5)$$

In the following discussion the pixel indices are suppressed in the notation and the measured quantities are understood to pertain to each camera pixel. The delta function model allows the following simplification:

$$M1 = f \sin^2[h * V(2 \, r/c)] \sum_{k=1}^{N} I(k), \qquad (6)$$

$$M2 = g \cos^2[h * V(2 \, r/c)] \sum_{k=1}^{N} I(k), \qquad (7)$$

where I(k) indicates that the reflected energy in the different reflected pulses may vary, whereas the range r is assumed to be constant over the camera cycle.

With respect to self-normalized ratios, note that the ratio, $$M1/M2 = f/g \tan^2[h * V(2r/c)], \qquad (8)$$

is independent of the sum of intensities of the reflected pulses. This independence will be referred to as "self-normalization" and is in fact a significant aspect of the FIG. 1 system since the cancellation of absolute intensity values is of tangible practical benefit in a physical embodiment of the FIG. 1 system.

With respect to an equation solution for range maps, having a knowledge of the voltage modulation V(u) or more specifically of its inverse function, u = W[V], allows solving for the unknown range r in terms of the ratio, S, of camera measurements (M1,M2) and known constants (f,g); i.e., $$r = c * u/2 = c/2 W[\sin^{-1}(S)/h] \qquad (9)$$

where $$S = (g * M1)/(f * M2)) \qquad (10)$$

Thus the range r(i,j) for each pixel is a function of the ratio of the amounts of light, M1(i,j) and M2(i,j), gathered at corresponding pixels in each camera. This relationship is an underlying concept of the FIG. 1 system. With respect to self-normalized ratios, it is noted that the sums over I(k) in equations 6 and 7 are equal. We assume that the range r remains a constant over the acquisition time for N pulses so that the ratio M1/M2 is independent of the absolute intensity measurements made by each camera in integrating N pulses as well as the absolute intensities from the reflection of individual pulses. It is interesting to note that in the imaging and ranging system of the present invention, the integration of pixel intensities received during multiple laser pulse illumination of the target accomplishes a time averaging of the pixel pulses to improve the signal to noise ratio which also tends to facilitate the conditions for self-normalization. This feature is based on a mathematical approximation, referred to as the pulse set approximation:

$$M1/M2 = \Sigma[M1(k)]/\Sigma[m2(k)] = \Sigma[M1(k)/M2(k)]/N \qquad (11)$$

where $$rk = r \text{ constant range over one camera frame} \qquad (12)$$

$$M1(k) = f \sin^2[h * V(2rk/c)] * I(k) \qquad (13)$$

$$M2(k) = f \cos^2[h * V(2rk/c)] * I(k) \qquad (14)$$

$$N = \text{number of pulses per frame} \qquad (15)$$

This approximation provides a basis for integrating N pulses per camera frame to compensate for a low reflected intensity obtained with a single pulse per camera frame. It also provides a basis for using the ratio of accumulated averages M1 and M2, which are two direct and electrically buffered measurements by the cameras 101 and 102 in one frame time to approximate the average of N paired ratios <M1(k)/M2(k)>.

From a mathematical consideration the operating concepts of the FIG. 1 ranging and imaging system and the FIG. 3 illustrated waveforms may be appreciated by considering that the proportioning of the return light into two cameras with the time dependent ramp measures the time-of-arrival of the returning light and therefore the range coordinate r.

With respect to delay time and width of the proportioning voltage signals applied to the electro-optic element 128 in FIG. 1, the time delay Td at 330 in FIG. 3 and the ramp width Tmax at 306 may be software controlled or hardware controlled by circuit elements added to the driver signal generator circuit 108 in FIG. 1. The delay time is large enough to accommodate a time delay and avoid overlapping return signals from different laser pulses 331 and 332 in FIG. 3.

It is also interesting to note that the depth of field for the present invention, that is the resolution, can be controlled electronically by way of adjusting the time delay and pulse duration of a signal voltage applied to the electro-optical polarizing element 128 in FIG. 1. The time delay Td determines the minimum distance of the range fields, (c Td)/2. Both Td and Tmax determine the maximum distance c(Td+Tmax)/2. The width of the range field equals (c*Tmax)/2. The delay time may be varied to optimize allocations of the range quantization and depth of field of the FIG. 1 system. The maximum resolution on a target surface occurs when the range field matches the radial depth of the viewed target surface. This means, for example, smaller Tmax for smaller target depths and larger Td for more distant targets.

According to the pixel intensity coding arrangement described above for the most closely located and the most distally located portions of the target image, separate partial images of the target 100 are received in the two cameras 101 and 102. Neither of these images is in fact a complete representation of the target 100. To obtain a complete image of the target, however, the images communicated by way of the two cameras 101 and 102 may be combined, such combination being preferably achieved by addition of the individual pixel intensities in the images formed by the cameras 101 and 102 to determine the intensity of the target image pixel. According to this combination arrangement, the intensity of a target image pixel is determined by the square root of the sums of the squares or the root mean of the square value of the two individual intensities resulting from the images of the cameras 101 and 102. In some cases, it may desirable to compensate for differential gain between the two cameras as discussed above.

It is also notable that the range mapping system of the present invention operates without regard to the absolute values of pixel intensity observed in the system cameras; that is, as has been shown above herein, the absolute values of intensities mathematically cancel and only the ratio of intensities appears in the output signal from the system.

The FIG. 1 system has been described in terms presuming the achieving of precise pixel to pixel registrations on the retinas of the cameras 101 and 102 and the precise pixel to pixel comparisons of retina collected data. Although this is a somewhat idealistic basis for accomplishing image pixel comparisons it may be achievable in some systems according to the invention. In many embodiments it may, however, be more practical to accomplish the comparisons on a local average or local neighborhood of pixels basis according to averaging arrangements that are known in the art.

With respect to a further aspect of the invention the energy in the outgoing laser pulse can be concentrated into a regular array of laser beamlets. Such a beam array may be formed via a prism that is inserted in the optical path 114 in FIG. 1. This can be accomplished in a number of ways, for example as explained in the hereby incorporated by reference publication by J. Taboada, "Laser Generated Beam Array for Commutation of Spatially Modulated Optical Signals," Proceedings 1986 Society of Photo-Optic Instrumentation Engineers, Vol 698:198 (1986). The concentration of energy of the laser pulse into an array of beamlets may provide several advantages in the system in FIG. 1. The array could facilitate the registration of the two cameras. This concentration of energy could be, for example, used to extend the range sensitivity in the directions sampled by the beamlets.

The present invention therefore provides a number of improvements to the imaging and ranging art. Among these improvements are:

1. An electronic time scan with no moving parts.
2. Parallel optical scanning generated optical images and range maps which are fully registered. This provides capability for optimal parallel processing.
3. A time of flight approach to range mapping -- accomplished without high frequency clocking as used by conventional light detection and ranging systems.
4. A range map is achieved with a reflecting telescope.
5. Image amplification is achieved with a reflecting telescope.
6. The target illumination can use strong laser output.
7. The system achieves a new type of mono-axis ranging device using parallel time of flight measurement and facilitates repetitive accumulation of signals via phase locked laser pulsing cycles.
8. A laser beam array as described in the 1986 publication above can be used to calibrate two cameras in order that corresponding images coincide at corresponding pixels in both cameras.
9. The projected laser beam can make use of structured encoding such as a spatial-temporal modulated beam or fringe arrays for increased information yield.
10. The system employs one camera frame of time to achieve capture of two camera images.
11. In optimized arrangements a two camera system data capture may be achievable with the optical energy of a single laser pulse.

The invention therefore advances the art for obtaining a range image at high speed and in real time for a scene presented to a camera based vision system. The described system captures two-dimensional images which contain range information encoded into a ratio of registered pixel pairs. A numerical map of the range distributed in perfect registry with an optical image is therefore a possible output arrangement for the data collected by the system.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:
1. The method for acquiring a range map of a distal three-dimensional object comprising the steps of:
   illuminating the distal object via a single optical aperture with short duration laser energy optical pulses;
   collecting target reflected laser energy optical pulses into a time encoding optical amplitude modulator;
   imprinting within said modulator a pattern of time dependent optical intensity modulation on said optical pulses;
   segregating the optical output of said modulator into two time dependent complementary amplitude optical portions;

receiving said complementary portions onto the retinas of two optical-to-electrical energy transducer devices to generate a pair of electrical signals;

determining from related pixel relative amplitudes of said electrical signals the relative arrival times of component portions of said reflected energy signals at said optical modulator; and generating from said relative arrival time determined component portions a range coded map image wherein arrival time and range are related by the speed of light.

2. The method of claim 1 further including the step of generating from a combination of said pair of electrical signals an optical image of said object.

3. The method of claim 2 wherein said related pixel relative amplitudes are local neighborhood of pixels determined.

4. The method of claim 2 wherein said related pixel relative amplitudes are pixel to corresponding pixel determined.

5. The method of claim 1 wherein said imprinting step is synchronized with and delayed from the occurrence of said laser pulses.

6. The method of claim 1 wherein said imprinting step includes modulating the polarization of said laser energy reflected optical pulses in response to a predetermined ramp waveform.

7. The method of claim 6 wherein said ramp waveform is mathematically monotonic in nature.

8. A laser imaging and ranging system comprising the combination of:

pulsed laser means for illuminating a distal three-dimensional target;

first and second electrical signal generating camera members optically energized by the reflected laser light signals received from said distal target;

modulated optical polarization means for segregating said reflected laser light signals proportionally into first camera received predominantly nearest target portion related components and second camera received predominantly distal-most target portion related components; and means for accessing the corresponding pixel point optically determined electrical signals from said first and second cameras and generating optical intensity coded signals therefrom.

9. The imaging and ranging system of claim 8 wherein said optical polarization means includes one of a Pockels cell member and a Kerr cell member and electrical sawtooth waveform means for controlling the transmission of polarized optical signals therethrough.

10. The imaging and ranging system of claim 8 wherein said camera members include solid state optical-to-electrical signal transducer members.

11. The imaging and ranging system of claim 8 wherein said laser means and said reflected laser light signals communicate between said system and said target via a single optical aperture.

12. Single optical aperture two camera imaging and ranging apparatus comprising the combination of:

pulsed laser target illumination means communicating via said single optical aperture with a distal target;

means including a pair of optical signal to electrical signal transducing camera members for generating first and second range coding distinguished pixel intensity array partial image electrical signal representations of said distal target;

first and second electrical memory means for storing said first and second partial image electrical signal representations in pixel organized array;

modulated optical path means including polarization means and optical beamsplitter means disposed in the reflected light path coupling said target said single aperture and said camera members for generating a pair of range-coded pixel intensity array partial optical images of said distal targets, one for each said camera member;

modulation waveform generating electrical circuit means coupled with said modulated optical path means for controlling the modulation characteristics thereof in response to a predetermined target signal time of arrival discriminating mathematical function; and mathematical algorithm characterized electrical circuit means for computing the range determinative time of arrival coded intensity ratio of corresponding image pixels in said first and second electrical memory means stored partial images.

* * * * *